United States Patent [19]

Spies et al.

[11] Patent Number: 5,726,887
[45] Date of Patent: Mar. 10, 1998

[54] TEST PROCEDURE FOR A SAFETY SYSTEM IN A MOTOR VEHICLE

[75] Inventors: Hans Spies, Pfaffenhofen; Günter Fendt, Schrobenhausen, both of Germany

[73] Assignee: Temic Telefunken Microelectronic GmbH, Heilbronn, Germany

[21] Appl. No.: 498,833

[22] Filed: Jul. 6, 1995

[30] Foreign Application Priority Data

Jul. 8, 1994 [DE] Germany .................. 44 24 020.1

[51] Int. Cl.⁶ .................................................. B60R 21/32
[52] U.S. Cl. ............... 364/424.034; 364/424.055; 280/735; 307/10.1
[58] Field of Search ............... 364/424.055, 424.056, 364/424.057, 424.034; 280/728 R, 734, 735; 180/282; 340/436, 438; 307/10.1; 324/502

[56] References Cited

U.S. PATENT DOCUMENTS

| | | | |
|---|---|---|---|
| 4,608,501 | 8/1986 | Andres et al. | 180/274 |
| 4,853,623 | 8/1989 | Sterler et al. | 280/735 |
| 4,864,202 | 9/1989 | Nitschke et al. | 280/735 |
| 5,155,376 | 10/1992 | Okano | 280/735 |
| 5,261,694 | 11/1993 | White et al. | 280/735 |
| 5,409,258 | 4/1995 | Kawabata | 280/735 |
| 5,440,913 | 8/1995 | Crispin et al. | 307/10.1 |
| 5,493,270 | 2/1996 | Kondo | 280/735 |
| 5,513,878 | 5/1996 | Ueda | 280/735 |

FOREIGN PATENT DOCUMENTS

| | | |
|---|---|---|
| 0011680 | 6/1980 | European Pat. Off. . |
| 0343579 | 11/1989 | European Pat. Off. . |
| 0518501 | 12/1992 | European Pat. Off. . |
| 2222038 | 11/1977 | Germany . |
| 3001780 C2 | 9/1984 | Germany . |
| 2808872 C2 | 1/1986 | Germany . |
| 3603659 C1 | 7/1987 | Germany . |
| 3627241 A1 | 2/1988 | Germany . |
| 3731836 A1 | 4/1988 | Germany . |
| 3812762 A1 | 10/1989 | Germany . |
| 3922506 A1 | 1/1991 | Germany . |
| 4027626 A1 | 3/1992 | Germany . |
| 4218645 | 12/1992 | Germany . |
| 4124987 A1 | 1/1993 | Germany . |
| 4241135 A1 | 6/1993 | Germany . |
| 4321589 | 1/1994 | Germany . |
| 88/04074 | 6/1988 | WIPO . |

*Primary Examiner*—Gary Chin
*Attorney, Agent, or Firm*—Spencer & Frank

[57] ABSTRACT

This invention concerns a test procedure for a safety system in motor vehicles, in particular occupant protection devices such as airbag, belt tightener, or roll bar sensors. As a rule, the associated safety-critical circuit components of such safety systems will be monitored by additional and separate monitoring processors. According to this invention, a test procedure for these safety-critical circuit components requires little expense and which, using a simple-to-implement monitoring unit, will allow the same test quality to be achieved as with an independent monitoring computer.

11 Claims, 1 Drawing Sheet

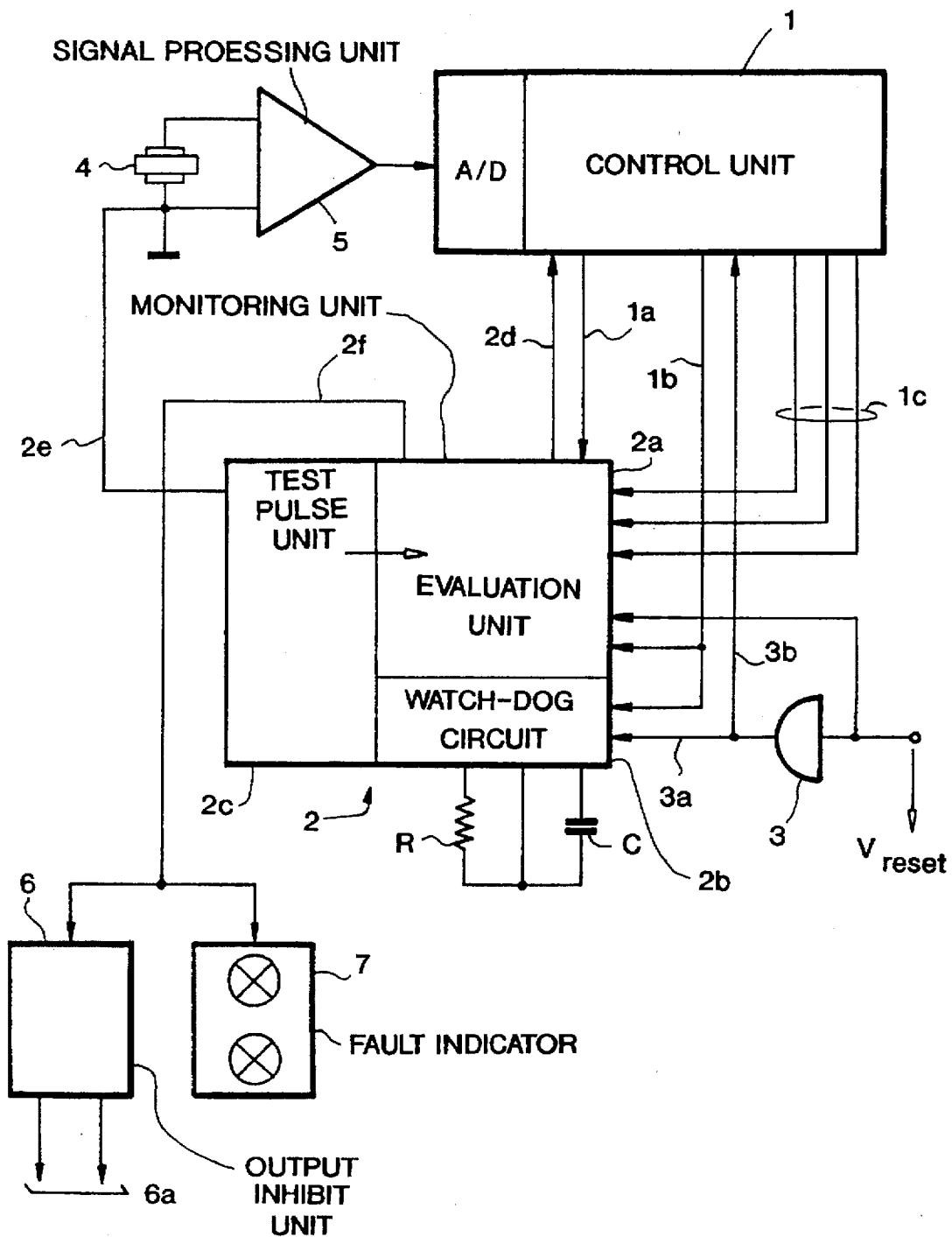

TEST PROCEDURE FOR A SAFETY SYSTEM IN A MOTOR VEHICLE

BACKGROUND OF THE INVENTION

This invention concerns a test procedure for a safety system in motor vehicles, comprising
- a) at least one collision sensor connected to a signal processing circuit,
- b) a trigger output stage for triggering at least one electrically operated means of deployment for a restraint device of this safety system, and
- c) a control unit evaluating the signals generated by the signal processing circuit with regard to the trigger criteria for the safety device.

The requirements stipulated to be effective for occupant safety system in motor vehicles during the entire service life of a motor vehicle are extremely stringent. To meet these stringent requirements, design concepts have been proposed which provide for an additional control unit supplementary to the control unit associated with the safety system; as a rule this additional control unit is a microprocessor and is to monitor the control unit associated with the safety system. Such a design concept comprising a monitoring computer will increase the safety and reliability of the safety system on the one hand, but on the other will also cause a very considerable increase in costs for such a safety system.

SUMMARY OF THE INVENTION

The object of the invention is to provide a test procedure for a safety system in motor vehicles which is cost-effective to implement, and at the same time does not detract from the reliability of the safety system when compared to the use of a monitoring processor.

According to the invention, this test procedure—representing a self-diagnosis—for a safety system in motor vehicles will be implemented by means of a monitoring unit which generates test pulses after the safety system has been switched on. These test pulses will be fed to a signal processing unit for the sensor; this processing unit will then feed the processed signals to the control unit, which control unit effectively works as a trigger computer and will now evaluate these signals with regard to the truth criteria for the safety system and then return the results of this evaluation to the monitoring unit. Depending on this result, i.e. whether the evaluation made by the control unit was true or false, the trigger output stage will either be released or inhibited. With a test procedure according to this invention, the circuit components of this safety system—that is, the signal processing unit for the sensor as well as the control unit—will go through a test phase, thus ensuring that it will only be possible to release the trigger output stage, if the signal processing unit and the control unit are both fully functional. Due to the fact that the test procedure according to this invention obviates the need for a monitoring microprocessor, this test procedure can be implemented extremely cost-effectively; but with regard to functionality and test reliability it still equals an independent monitoring microprocessor.

According to an advantageous further application of a test procedure pursuant to this invention, the test pulses generated by the monitoring unit will be fed sequentially into the signal processing unit for the sensor, leading to a further simplified circuit arrangement.

With another implementation of this invention, an improvement in test quality will be achieved by the monitoring unit generating a random sequence for the sequence of test pulses.

To implement this test procedure, the control unit will generate a start signal after the safety system has been switched on; this start signal will be fed to the monitoring unit, turning this unit into a master device and the control unit into a slave device, and causing the monitoring unit to generate test pulses as well as to evaluate the evaluation results generated by the control unit.

Furthermore, for an advantageous application of this invention, the monitoring unit will generate at least three test pulses which are all different from each other. Preferably, one of these test pulses can take the form of a triggering pulse, simulating a collision detected by the sensor and causing the safety device to be triggered. Another test pulse can be implemented such that it will simulate a collision detected by the sensor but not causing the safety device to be triggered. Finally, the virtual non-existence of a pulse can be defined as a third test pulse in its own right.

Finally, the test procedure according to this invention can be implemented by means of a simple circuit arrangement, merely comprising an evaluation unit and a test pulse unit with a random sequence generator necessary for evaluating test pulses. This circuit arrangement can be advantageously integrated into the printed circuit board carrying the electronic components of the safety system, which printed circuit board will also additionally be fitted with further circuit components of the same safety system.

BRIEF DESCRIPTION OF THE DRAWINGS

In the following, and in conjunction with a block diagram as shown in the figure, the test procedure according to this invention is to be described and explained using an implementation example.

DESCRIPTION OF THE PREFERRED EMBODIMENTS

The figure shows a trigger circuit for an occupant protection system in motor vehicles, complete with a control unit 1—which, as a rule, is a microprocessor—, a monitoring unit 2, a signal processing unit 5 which has a preconnected sensor 4 (e.g. an acceleration sensor), as well as an output stage inhibit unit 6, and a fault indicator 7. The trigger output stage, associated with this circuit, for triggering at least one electrically operated triggering device—e.g. a trigger pellet—for a restraint device within the safety system will not be shown here. For instance, an airbag, a belt tightener, or a roll-bar may be regarded as such a restraint device, with sensor 4 representing a roll sensor in the latter case. And finally, for a side airbag, a contact sensor may be used instead of acceleration sensor 4.

In the circuit as shown in the figure, the signals generated by sensor 4 will be fed into the signal processing circuit 5, which as a role comprises amplifier and filter and can be integrated into the acceleration transducer casing. The signal processsing circuit 5 serves to condition the signal from sensor 4 analog output signal of signal processing circuit 5 will be fed into an A/D converter portion of the control unit 1 before evaluation by control unit 1. The digital data generated by this A/D converter portion will now be subjected to an algorithm stored in control unit 1 with regard to the triggering criteria for the restraint device. This evaluation will end with a result as to whether a motor vehicle collision event has occurred which would necessitate the release or inhibition of the restraint device within the safety system. Monitoring circuit 2 described below will be used to test this sequence of operation, carried out by signal processing unit 5 as well as control unit 1, with respect to its functionality.

This monitoring circuit 2 comprises an evaluation unit 2a, a test pulse unit 2c which generates test pulses and includes a random sequence generator, and finally a window watch-dog circuit 2b whose function is to be explained below. When this trigger circuit is switched on, i.e. when starting the motor vehicle, a reset signal $V_{reset}$ will be generated by a power supply, or a reset logic device, and fed into evaluation unit 2a or—via a NAND gate 3—into control unit 1, as well as to window watch-dog circuit 2b. This will initiate generation of a start signal by control unit 1, which start signal will be transmitted to evaluation unit 2a, via a line 1a, as a result of which transmission the test pulse unit 2c of monitoring unit 2 will generate test pulses in a random sequence and feed these test pulses sequentially into signal processing unit 5, namely where sensor 4 output signals will also be in contact. These test pulses simulate sensor 4 output signals representing defined operating conditions of the motor vehicle. Using these simulated output signals, signal processing unit 5 as well as control unit 1 are to demonstrate their functionality. The evaluation result generated by control unit 1 will be statically fed into monitoring unit 2, via three lines 1c of evaluation unit 2a. Instead of using a static transmission, the evaluation result may also be fed serially, via a single line, into monitoring unit 2. The evaluation unit 2a of monitoring unit 2 will now provide a check of these evaluation results by comparing these with the defined operating condition represented by the test pulses generated by circuit 2c, and by deciding whether these test pulses have been processed correctly by signal processing unit 5 and control unit 1. If the result of such checking by evaluation unit 2a is positive, output stage inhibit unit 6 will be removed, via a line 2f, so that it will now be possible to actuate the triggering device—e.g., a trigger pellet—within the safety system. In the opposite case, if the result of this check is negative, the trigger output stage will be inhibited—that is, not actuated—via lines 6a of output stage inhibit unit 6. In addition, this negative result will be indicated by fault indicator 7, such as a fault display. Finally, the result of this check will be transmitted from evaluation unit 2a, via a line 2d, to control unit 1.

In the present case, three different pulses will be generated as test pulses, by means of the random sequence generator of test pulse unit 2c, namely a trigger pulse with a pulse duration of 10 ms (for example), a non-trigger pulse of 1 ms (for example), and a pulse with a pulse duration of around 0 ms. These pulses, evaluated by signal processing unit 5 and control unit 1, will be monitored by evaluation unit 2a—in particular, with regard to the temporal sequence of test pulses. The number of test pulses is not limited to just three but may also be greater depending, in particular, on both sensor type as well as the type of algorithm, stored in control unit 1, used for evaluating these test pulses.

This test procedure, representing a self-diagnosis, will ensure that the output stage inhibit unit 6 can only be actuated when control unit 1 is fully functional, as, during this test phase, evaluation unit 2a of monitoring unit 2 will take over the master function, and control unit 1 will be declared to be a slave unit.

Another advantage of the test procedure described here is also that the A/D converter portion of the control unit 1 and the trigger algorithm stored in control unit 1 may automatically be included in this test.

The test phase described above will only be carried out once, that is, when the safety system is switched on, whereas the window watch-dog circuit 2b will carry out cyclic testing at intervals of approximately 1 ms. During these test phases, this watch-dog 2b will be continuously supplied, via a line 1b, with a "calming signal" at intervals of 1 ms. The RC element allocated to watch-dog circuit 2b will be used as a time base for this circuit. Instead of a RC element, a resonator or a quartz time base may also be used.

By means of the test procedure described here, a test reliability will be achieved which is just as high as that achieved by an independent monitoring processor, with the window watch-dog being required as a supplementary device for carrying out cyclic testing.

Finally, it is possible to implement the monitoring unit according to this invention, together with other circuit components of the safety system, as an ASIC (Application Specific Integrated Circuit) on an electronic board. These additional circuit components may for instance comprise trigger output stages or power amplifiers, power supply unit, up/down controls, reference voltage generation unit, fault indicator drive unit, seat occupancy detection system, test current generation for trigger pellet monitoring, crash output, communications interface, voltage monitoring, charging circuit for trigger capacitors etc. The monitoring unit itself will take up about 3% to 5% of the entire ASIC surface area.

This invention is not limited to generate test pulses for a single sensor only, as shown in the above-described implementation example according to the figure. But it is also possible that unit 2c of monitoring unit 2 will generate test pulses for additional sensors, which test pulses will be fed to these sensors via additional lines.

What is claimed is:

1. A test procedure for a motor vehicle safety system which includes a sensor, a signal processing unit connected to the sensor for conditioning a signal from the sensor, a restraint device, trigger means for triggering the restraint device, and control unit means for evaluating a signal from the signal processing unit to determine whether trigger criteria for triggering the restraint device have been met, said test procedure comprising the steps of:

(a) switching the safety system on;

(b) emitting a sequence of test pulses from a monitoring unit after the safety system has been switched on, at least one test pulse of the sequence having a duration that is different from at least one other test pulse of the sequence;

(c) feeding the test pulses to the signal processing unit;

(d) using the control unit means to generate an evaluation result from the test pulses;

(e) feeding the evaluation result to the monitoring unit;

(f) checking the evaluation result for accuracy in the monitoring unit; and (g) actuating or inhibiting the trigger means depending on the accuracy check conducted in step (f).

2. The test procedure according to claim 1, wherein step (b) is conducted by emitting the test pulses sequentially, and step (c) is conducted by sequentially feeding the test pulses into the signal processing unit.

3. The test procedure according to claim 1, wherein step (b) is conducted by emitting a random sequence of test pulses.

4. The test procedure according to claim 3, further comprising the step of feeding a start signal from the control unit means to the monitoring unit following switch-on of the safety system in step (a), the monitoring unit thereupon becoming a master device and the control unit means becoming a slave device during the test procedure.

5. The test procedure according to claim 3, wherein the random sequence includes at least three test pulses which are all different from each other.

6. The test procedure according to claim 5, wherein at least one of said test pulses is a trigger pulse simulating a collision detected by the sensor which would cause the restraint device to be triggered.

7. The test procedure according to claim 6, wherein at lest one further test pulse is a non-trigger pulse simulating a collision detected by the sensor which would not cause the restraint device to be triggered.

8. The test procedure according to claim 7, wherein at least one additional test pulse has a pulse duration of about 0 ms.

9. The test procedure according to claim 1, wherein step (f) comprises comparing the evaluation result with an expected result for the sequence of test pulses.

10. A monitoring unit for a motor vehicle safety system which includes a sensor, a signal processing unit connected to the sensor for conditioning a signal from the sensor, a restraint device, trigger means for triggering the restraint device, and control unit means for evaluating a signal from the signal processing unit to determine whether trigger criteria for triggering the restraint device have been met, said monitoring unit comprising:

test pulse unit means for emitting a sequence of test pulses after the safety system has been switched on, at least one test pulse of the sequence having a duration that is different from at least one other test pulse of the sequence, the test pulses being fed to the signal processing unit and, after being processed by the signal processing unit, being used by the control unit means to generate an evaluation result; and evaluation unit means for receiving the evaluation result and checking the evaluation result for accuracy, the trigger means being actuated or inhibited depending on the accuracy check, wherein the test pulse unit means comprises a random sequence generator.

11. A monitoring unit according to claim 10, wherein the monitoring unit further comprises a window watch-dog circuit for cyclically checking whether the control unit means emits a calming signal during a time window.

* * * * *